United States Statutory Invention Registration [19]

[11] Reg. Number: H949

Ishizuka et al.

[43] Published: Aug. 6, 1991

[54] DEVICE FOR MEASURING IONIC ACTIVITY

[75] Inventors: Kimiko Ishizuka; Osamu Seshimoto, both of Saitama, Japan

[73] Assignee: Fuji Photo Film Co., Ltd., Kanagawa, Japan

[21] Appl. No.: 321,979

[22] Filed: Mar. 10, 1989

[30] Foreign Application Priority Data

Mar. 16, 1988 [JP] Japan ..... 63-62148

[51] Int. Cl.[5] ..... G01N 27/46

[52] U.S. Cl. ..... 204/416

[58] Field of Search ..... 204/403, 411, 412, 416, 204/418, 419, 420, 433, 1 H, 1 K

[56] References Cited

U.S. PATENT DOCUMENTS

| | | | |
|---|---|---|---|
| 4,282,079 | 8/1981 | Chang et al. | 204/435 X |
| 4,505,801 | 3/1985 | Detwiler et al. | 204/418 |
| 4,655,899 | 4/1987 | Saito et al. | 204/412 |
| 4,786,394 | 11/1988 | Enzer et al. | 204/401 |
| 4,816,131 | 3/1989 | Bomsztyk | 204/403 |
| 4,818,361 | 4/1989 | Burgess et al. | 204/406 |

*Primary Examiner*—Matthew A. Thexton
*Assistant Examiner*—Chhaya Sayala
*Attorney, Agent, or Firm*—Jules E. Goldberg

[57] ABSTRACT

A device for measuring the activity of carbonate ions and hydrogen ions comprises a carbonate ion selective electrode pair and a hydrogen ion selective electrode pair. Each ion selective electrode comprises a metal layer, metal halide layer and ion selective layer superposed in this order. A porous bridge is disposed so as to achieve a liquid junction between the ion selective electrodes of each electrode pair.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DEVICE FOR MEASURING IONIC ACTIVITY

BACKGROUND OF THE INVENTION

1. Field of the Invention

This invention relates to a device for potentiometrically determining the activity (concentrations) of carbonate and hydrogen ions in aqueous liquid samples and various aqueous solutions, especially in body fluids such as blood, blood plasma, blood serum and urine. In particular, this invention relates to a device on which a single drop of each of a reference liquid and a liquid sample are spotted and with which the concentration of carbonates (or carbonate ions) in and the pH value of a liquid sample can simultaneously be determined.

2. Description of the Prior Art

In body fluids, various mechanisms act against exogenous or endogenous acids and bases so that the pH value thereof is kept within the range of 7.40±0.05. The most important chemical buffer action inherent in organisms is the hydrogencarbonate system.

As indicated by the Henderson-Hasselbalch expression: $pH=pK+\log[HCO_3^-]-\log[\alpha.P\&_{co2}]$. The pH value is determined from the concentration of hydrogencarbonate ions ($HCO_3^-$) and the partial pressure of carbonates ($P_{CO2}$).

In the above expression, pK and $\alpha$ denote the dissociation constant of hydrogencarbonate ions and the solubility coefficient of carbonates, respectively. They are values which ar determined by temperature and pH. The pH, $TCO_2$ (total carbonate concentration), $P_{co2}$ and $HCO_3^-$ concentration can be calculated on the basis of the above expression when at least two of the parameters just mentioned are known.

Abnormalities in the pH are grouped into acidosis in which the pH shifts to the acid side and alkalosis in which the pH shifts to the basic side. According to the causes thereof, they are further divided into metabolic acidosis and alkalosis which are mainly caused by abnormalities in the concentration of $HCO_3^-$ and respiratory acidosis and alkalosis which are mainly caused by abnormalities in the $P_{co2}$. When an abnormality in the acid-base equilibrium occurs, the $P_{co2}$ and the concentration of $HCO_3^-$ can be calculated on the basis of the above expression if the concentration of carbonates and the pH value are known, and thereby the cause for the abnormality in the pH can be presumed.

Measurements of the concentration of carbonates and the pH value in blood samples should be conducted as soon as possible after the blood samples are collected. This is because the $P_{co2}$ in body fluids is more than 100 times as high as that in the air. That is, if the blood samples are not kept from coming into contact with air, the $P_{co2}$ thereof will decrease immediately after they have been collected. Thus, the pH value of the blood samples increases according to the Henderson-Hasselbalch expression. Also, even when the blood samples are kept from coming into contact with air, their pH value decreases (changes toward the acidic region) due to an increase in the $P_{co2}$ as time passes. As seen from the Henderson-Hasselbalch expression, the concentration of carbonates will yield an error if the pH value fluctuates. However, in most of the conventional measuring devices, the concentration of carbonate ions cannot be measured immediately after the blood is collected, since whole blood cannot be subjected to measurements until after the blood cells are separated therefrom by means of a centrifuge or the like. Also, in order to further examine the acid-base equilibrium, many items such as the pH, the concentration of carbonates, the $P_{co2}$ and the concentration of $HCO_3^-$ must be measured.

SUMMARY OF THE INVENTION

The object of the present invention is to provide a device for measuring ionic activity, which device has a carbonate ion selective electrode and a pH electrode.

A single drop of each of a reference liquid and a sample liquid are spotted on the device of the present invention, and then the concentration of carbonate ions in and the pH value of the liquid sample can be determined. Accordingly, the $P_{co2}$ and the concentration of $HCO_3^-$ can be calculated simultaneously from these values.

With the device in accordance with the present invention measurements on whole blood can be made without the necessity of pre-treating the blood. For example, it is not necessary to separate the blood cells immediately after the blood samples are collected. Also, since the pH and the concentration of carbonate ions can be measured simultaneously in the device in accordance with the present invention, the potential difference between the electrodes of a carbonate ion selective electrode pair which has no buffer layer can be measured, and the value of the potential thus measured can be corrected with reference to the pH value obtained from measurements taken at a hydrogen ion selective electrode. From the corrected value of the potential measured between the electrodes of the carbonate ion selective pair, a correct carbonate ion concentration can be calculated.

The device in accordance with the present invention comprises a carbonate ion selective electrode pair and a pH electrode pair. Each ion selective electrode which forms these electrode pairs comprises a metal layer, a metal halide layer, an electrolyte layer, which is provided if necessary, an ion selective layer, and a buffer layer which is provided if necessary, which layers are superposed in this order. These ion selective electrode pairs are placed close to each other in a frame, although a space is maintained between them to prevent the ends of the electrodes from contacting each other and creating a short circuit. A porous bridge is disposed on a frame of the device, such that it is in contact with the ion selective layers or buffer layers of the above-mentioned ion selective electrode pairs or such that it will come into contact with these layers when a liquid is supplied to the electrodes.

Preferably, liquid distributing members are provided between the porous bridge and the ion selective layers or the buffer layers such that one or two of the liquid distributing members is in contact with the ion selective layer or buffer layer of two different electrodes, one from each electrode pair, or such that one or two of the liquid distributing members contact the ion selective layers or buffer layers of two different electrodes, one from each electrode pair, via a liquid when the liquid is supplied to the device.

Preferably, the porous bridge is made of yarn, while the liquid distributing members are made of pieces of woven cloth which are formed of yarn or pieces of non-woven cloth which are formed of filament strings or yarn.

The device in accordance with the present invention is a slide-like device in which a carbonate ion selective electrode pair and a pH electrode pair are placed in a support frame. A single drop of each of the liquid sample and a reference liquid are spotted on the device, after which the concentration of carbonate ions and the pH value of a liquid sample can be determined. Each of the electrodes in these two sets of ion selective electrode pairs are placed horizontally and close together in a support frame while maintaining a space therebetween which prevents the ends of the electrodes from contacting each other and creating a short circuit. Preferably, only a single pair of apertures for liquid spotting are formed in the center portion of an upper frame of the device. The porous liquid distributing members may be disposed such that liquids are distributed from one aperture to one electrode in each of the two different electrode pairs. The two different ion selective electrode pairs may be placed symmetrically or asymmetrically with respect to a line which connects the two apertures to each other.

As the ion selective electrode pairs, film-like (sheet-like), barrel-like or wire-like ion selective electrodes can be used. In particular, film-like ion selective electrode pairs are preferable.

DESCRIPTION OF THE PREFERRED EMBODIMENTS

The present invention will hereinbelow be described in further detail with reference to the accompanying drawings.

Figure 1:
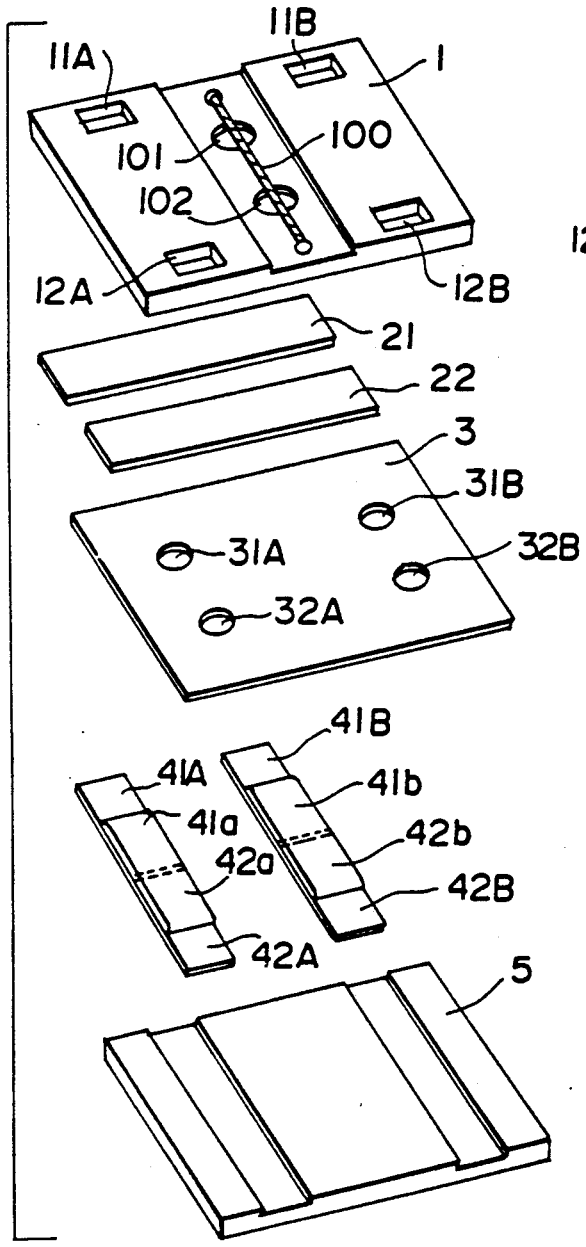
FIG. 1 is a perspective exploded view showing the device in accordance with a first embodiment of the present invention.
Figure 2:
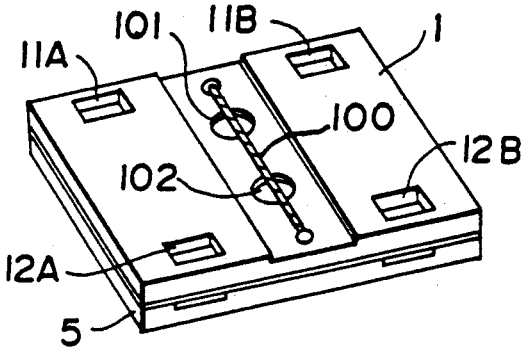
FIG. 2 is a perspective view showing the exterior of the device of FIG. 1.

FIG. 1 is a perspective exploded view showing the device in accordance with a first embodiment of the present invention, and FIG. 2 is a perspective view showing the exterior thereof.

The device shown in these drawings comprises an upper frame 1, porous liquid distributing members 21 and 22, a water impermeable layer 3, a pair of carbonate ion selective electrodes 41A and 42A, a pair of pH electrodes 41B and 42B, and a lower frame 5. The upper frame has a pair of apertures for liquid spotting 101 and 102 (for a reference liquid and a liquid sample, respectively), a porous bridge 100 (preferably made of polyethylene terephthalate yarn) and apertures 11A, 11B, 12A and 12B through which probes may be inserted. The apertures 11A and 12A open into the pair of ion selective electrodes 41A and 42A, while the apertures 11B and 12B open into the pair of ion selective electrodes 41B and 42B, respectively. Preferably the upper frame is made of a thermoplastic material (e.g. a thermoplastic organic polymer). Both ends of the porous bridge 100 are fixed to the upper frame 1 at positions between the apertures 101 and 102 and the edges of the upper frame 1 such that the porous bridge 100 extends over the apertures 101 and 102. In cases where the upper frame 1 is made of a thermoplastic material, the porous bridge 100 is fixed thereto by softening or melting the thermoplastic material.

The carbonate ion selective electrode pair comprises the ion selective electrodes 41A and 42A which have functional layers **41*a* and 42*a***, respectively. The functional layers are layers constituting the ion-selective electrodes, e.g. a metal halide layer, an electrolyte layer, an ion-selective layer, a buffer layer and a protective layer. The topmost layer of the functional layers is the ion-selective layer, buffer layer or protective layer. Preferably, the carbonate ion selective electrode pair and the pH electrode pair are formed on a non-conductive sheet and the two electrodes in each pair are insulated from each other by a groove according to the method described in U.S. Pat. No. 4,683,048.

In the water-impermeable layer 3, liquid supplying apertures 31A, 32A, 31B and 32B are formed so as to open into the functional layers **41*a*, 42*a*, 41*b* and 42*b*** of the two pairs of ion selective electrodes, respectively. Preferably, an adhesive layer, which has an affinity for the functional layers of the ion selective electrodes and does not substantially deteriorate their ion selective layers (outermost layers), is formed on a surface of the water-impermeable layer, which surface faces the electrodes. Preferably, an adhesive layer is also formed on the other surface which faces the upper frame so that the water-impermeable layer will adhere to the liquid distributing members and then to the upper frame. However, the adhesive layers are not essential to the present invention.

In the device in accordance with the first embodiment of the present invention, when a reference liquid, which has a known carbonate ion concentration and a known pH value, and a liquid sample are nearly simultaneously spotted into the apertures 101 and 102, respectively, the reference liquid is distributed onto the porous liquid distributing member 21 and is then supplied to the functional layers **41*a* and 41*b* of the ion selective electrodes 41A and 41B via the apertures 31A and 31B. Similarly, the liquid sample is supplied via the porous liquid distributing member 22 and the apertures 32A and 32B to the functional layers 42*a* and 42*b* of the ion selective electrodes 42A and 42B. On the other hand, the reference liquid and the liquid sample come into contact with each other near the center of the porous bridge 100 thereby achieving a liquid junction. Accordingly, ions migrate along the bridge, and the potential between the electrodes of the electrode pairs can be measured with an apparatus for measuring potential. The potential between the ion selective electrodes 41A and 42A corresponds to the difference between the carbonate ion concentration of the reference liquid and that of the liquid sample, while the potential between the ion selective electrodes 41B and 42B corresponds to the difference the pH of the reference liquid and that of the liquid sample. Therefore, when the probes of an apparatus for measuring potential (a voltmeter) are inserted into the aperture 11A, 12A, 11B and 12B** so as to contact the electrodes, the above-mentioned potential differences can be measured. Then the carbonate ion concentration and pH of the liquid sample can be determined from the potential differences and a set of standard curves which are based on Nernst's equation or on actually measured values.

Figure 3:
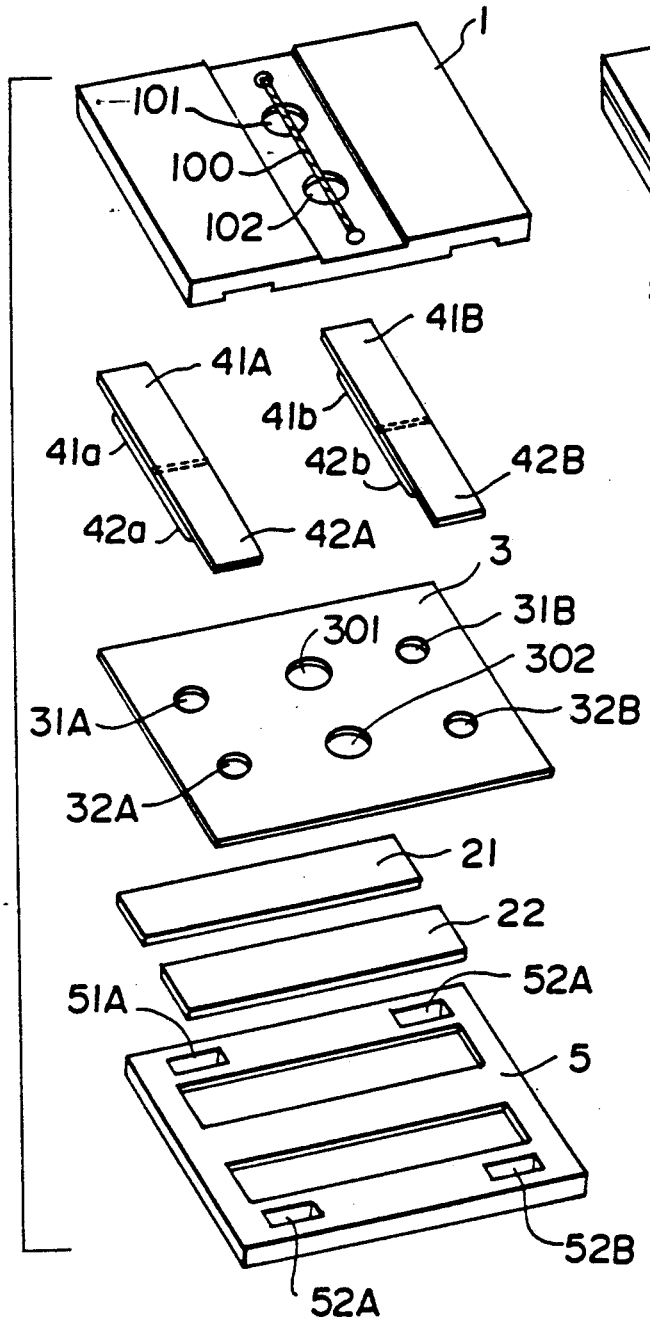
FIG. 3 is a perspective exploded view showing the device in accordance with a second embodiment of the present invention.
Figure 4:
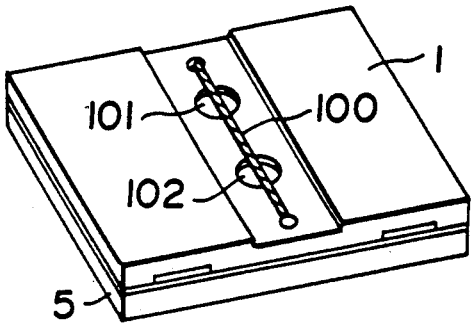
FIG. 4 is a perspective view showing the exterior of the device of FIG. 3.

FIG. 3 is perspective exploded view showing the device in accordance with a second embodiment of the present invention, and FIG. 4 is a perspective view showing the exterior thereof.

The device shown in these drawings comprises, like that of the first embodiment, an upper frame 1, porous liquid distributing members 21 and 22, a water-impermeable layer 3, a pair of carbonate ion selective electrodes 41A and 42A, a pair of pH electrodes 41B and 42B, and a lower frame 5. The upper frame 1 has a pair of apertures for liquid spotting 101 and 102 (for a reference liquid and a liquid sample, respectively) and a porous bridge 100 (preferably made of polyethylene terephthalate yarn). Preferably, the upper frame is made of a thermoplastic material (thermoplastic organic polymer). Both ends of the porous bridge 100 are fixed to the upper frame 1 at positions between the apertures 101 and 102 and edges of the upper frame 1 such that the porous bridge 100 extends over these apertures 101 and 102. In cases where the upper frame is made of a thermoplastic material, the porous bridge 100 is fixed thereto by softening or melting of the thermoplastic material.

In this embodiment, unlike the first embodiment, the two ion selective electrode pairs are attached to the upper frame 1 such that their functional layers face downward. Because of such a structure, apertures 51A, 52A, 51B and 52B into which probes may be inserted are formed in the lower frame in such a way that they open into the ion selective electrodes 41A, 42A, 41B and 42B, respectively. The water-impermeable layer 3 has liquid supplying apertures 31A, 32A, 31B and 32B which open into the functional layers of the ion selective electrodes, and in addition it has a pair of liquid supplying apertures 301 and 302 for supplying the liquids which have been spotted on the device to the porous liquid distributing members 21 and 22, respectively.

In the device in accordance with the second embodiment of the present invention, when a reference liquid, which has a known carbonate ion concentration and a known pH value, and a liquid sample are nearly simultaneously spotted into the apertures 101 and 102, respectively, the reference liquid is supplied to the liquid distributing member 21 through the aperture 30 and then to the functional layers **41*a* and 41*b* of the ion selective electrodes via the apertures 31A and 31B, respectively. Similarly, the liquid sample is supplied to the liquid distributing member 22 via the aperture 302 - and then to the functional layers 42*a* and 42*b* of the ion selective electrodes via apertures 32A and 32B, respectively. On the other hand, the reference liquid and the liquid sample come into contact with each other near the center of the porous bridge 100 thereby achieving a liquid junction. Accordingly, ions migrate along the bridge 100, and the potential between the electrodes of the electrode pairs can be measured with an apparatus for measuring potential (a voltmeter). The potential between the ion selective electrodes 41A and 42A depends on the difference between the carbonate ion concentration of the reference liquid and that of the liquid sample, while the potential between the ion selective electrodes 41B and 42B depends on the difference between the pH of the reference liquid and that of the liquid sample. Therefore, when the probes of an apparatus for measuring potential are inserted into the apertures 51A, 52A, 51B and 52B** so as to contact the electrodes, the above-mentioned potential differences can be measured. Then the carbonate ion concentration and pH of the liquid sample can be determined from the potentials and a set of standard curves which are based on Nernst's equation or on actually measured values.

Figure 5:
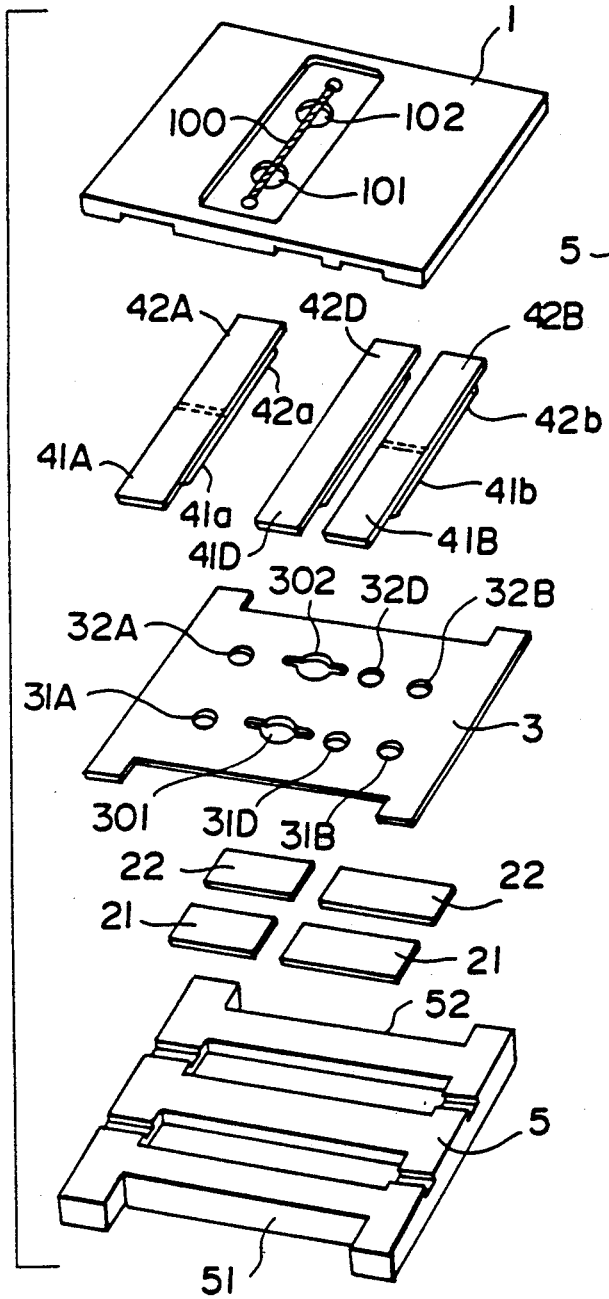
FIG. 5 is a perspective exploded view showing the device in accordance with a third embodiment of the present invention.
Figure 6:
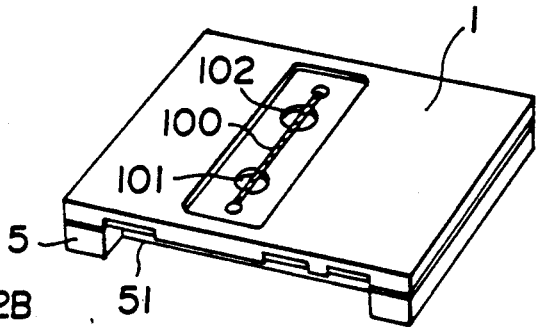
FIG. 6 is a perspective view showing the exterior of the device of FIG. 5.

FIG. 5 is a perspective exploded view showing the device in accordance with a third embodiment of the present invention, and FIG. 6 is a perspective view showing the exterior thereof.

The device shown in these drawings differs from that of the second embodiment only in that it has a pair of dummy electrodes (a pair of non-conductive polymer sheets the size of which corresponds to a pair of electrodes) provided therein, and in that the lower surface of the upper frame has indentations for receiving three pairs of electrodes formed therein, and in that the porous bridge is biassed toward one side of the line of symmetry between two sets of electrode pairs. In this embodiment, the carbonate ion selective electrode pair, the porous bridge, the dummy electrode pair and the pH electrode pair are put side by side in this order. However, they may be arranged with the pH electrode pair, the porous bridge, the dummy electrode pair and the carbonate ion selective electrode pair side by side in that order, or with the pH electrode pair, the porous bridge, the carbonate ion selective electrode pair and the dummy electrode pair side by side in that order. Apertures 31D and 32D which open into the dummy electrode pair may or may not be formed in the water-impermeable layer 3.

The device of the third embodiment can be produced in a manner similar to the device disclosed in U.S. Pat. No. 4,789,435. (The dummy electrode pair can be fixed to a frame in the same manner as the ion selective pairs.)

The procedure for measuring the carbonate ion concentration and the pH in which the device of the third embodiment is used is substantially the same as that in which the device of the second embodiment is used. Highly accurate measurements can be made easily when the device of the second or third embodiment and the analysis apparatus disclosed in U.S. Pat. Nos. 4,613,420 and 4,613,421 or the like are used. When this apparatus is provided with a program for calculating the partial pressure of carbonates, the partial pressure of carbonates ($P_{co2}$) can be determined simultaneously with the concentration of carbonate ions and the pH.

In the device in accordance with the present invention various types of known film-like (sheet-like), barrel-like, and wire-like carbonate ion selective electrodes (pairs) and pH electrodes (pairs) can be used. Preferably, film-like electrodes are used.

As a film-like ion selective electrode used when the activity (concentration) of whole carbonates (carbonate ions) is potentiometrically measured, carbonate ion selective electrodes such as the type disclosed in U.S. Pat. No. 4,272,328 may be used, which ion selective electrodes comprise a reference electrode (comprising a conductive metal layer and metal halide layer disposed thereon), an electrolyte layer containing an electrolyte and a hydrophilic polymer binder, a membrane layer containing an ionophore, and a buffer layer superposed in this order. Ion selective electrodes such as those disclosed in U.S. Pat. No. 4,505,801 may also be used. These electrodes comprise a reference electrode (comprising a conductive metal layer and a metal halide layer superposed thereon), an electrolyte layer containing an electrolyte and a hydrophilic polymer binder, a membrane layer containing an ionophore and an overcoat layer containing a nucleating agent such as calcium silicate which layers are mounted in this order. The ion selective electrodes may also be of the type disclosed in EP-A-288724, which electrodes comprise a reference electrode (comprising a conductive metal layer and a metal halide layer superposed thereon), a carbonate ion-selective layer containing an ion carrier, and a buffer layer superposed in this order.

As a film-like ion selective electrode used when the level of activity of hydrogen ions (or the concentration thereof, i.e. pH value) is potentiometrically measured, ion selective electrodes such as those disclosed in EP-A-74198 may be used. These ion selective electrodes comprise a reference electrode (comprising a conductive metal layer and a metal halide layer disposed thereon), an electrolyte layer containing an electrolyte and a hydrophilic polymer binder, and a hydrophobic hydrogen ion selective layer superposed in this order. Ion selective electrodes such as those disclosed in U.S. Pat. No. 4,282,079 which comprise a reference electrode (comprising a conductive electrode layer and a metal halide layer superposed thereon), an electrolyte layer containing an electrolyte and a hydrophilic polymer binder, an adhesive layer, and a cation selective glass layer (hydrogen ion selective layer) superposed in this order may also be used.

The above-mentioned film-like ion selective electrodes may be produced according to the method disclosed in the above-mentioned publications or other publications such as Japanese Unexamined Patent Publication No. 57(1982)-17851, U.S. Pat. Nos. 4,053,381, 4,272,328, 4,555,274 and 4,683,048. Preferably, the process disclosed in U.S. Pat. No. 4,683,048 is used. According to this method, an ion selective electrode pair is produced by forming a metal layer on a non-conductive support, forming a groove in the metal layer by using a bit (cutting tool) or the like such that the groove is deep enough to reach the support and divides the metal layer into two parts which are electrically isolated from each other, forming metal halide layers on the respective parts of the metal layer, and then forming a common ion selective layer thereon. In this way, a pair of ion selective electrodes which have uniform electrochemical characteristics can be produced.

EXAMPLE 1

Three kinds of control serum, each having a different concentration of carbonate ions and a different pH value, and three samples were spotted on the device of the second embodiment. The concentration of carbonate ions and the pH values of the samples were then measured. The control serums, in which the concentrations of carbonate ions and the pH values were calibrated, were used as reference liquids. The potential difference measured between the electrodes of each ion selective electrode pair are shown in TABLE 1. Also, for comparison, the carbonate ion concentration and the pH value of each sample were measured by using a Corning-965 electrode and a glass electrode, respectively.

TABLE 1

| | SAMPLE 1 | SAMPLE 2 | SAMPLE 3 |
|---|---|---|---|
| pH VALUE | 6.9 | 7.4 | 7.6 |
| CARBONATE CONCENTRATION (mmol) | 10.5 | 23.2 | 36.4 |
| pH (mV) | 27.4 | −0.3 | −14.5 |
| CARBONATE (mV) | 2.3 | −9.5 | −10.9 |

A linear relationship, which when graphed had a slope of −58 mV/dec, which slope approximates the stoichiometric slope (−60 mV/dec), was obtained from the values measured at the pH electrode pair, while a line having a slope of −26 mV/dec, which slope approximates the stoichiometric slope (−30 mV/dec), was obtained from the values measured at the carbonate ion selective electrode pair.

EXAMPLE 2

The device of the third embodiment was used to measure the pH value and the concentration of carbonate ions in fresh blood (whole blood) sample immediately after it had been collected from a human body.

The $P_{co2}$ was measured with a Corning-178 Blood Gas Analyzer (product name).

The results of the measurements are shown in TABLE 2.

TABLE 2

| | |
|---|---|
| pH VALUE | 7.38 |
| CARBONATE CONCENTRATION | 23.8 (mmol) |
| $P_{co2}$ VALUE | 38.8 (mmol) |

The $P_{co2}$ calculated from the Henderson-Hasselbalch expression nearly corresponded to that measured with the Corning-965 electrode. (The difference was about −0.9%.)

In the device of the present invention, whole blood can be subjected to measurements immediately after the collection thereof. Accordingly, it is unnecessary to separate blood cells therefrom by means of a centrifuge or the like. A single drop each of a reference liquid and of an aqueous liquid sample are spotted on the device, after which the concentration of carbonate ions in and the pH value of the liquid sample can be simultaneously measured. Also, the $P_{co2}$ and $HCO_3^-$ can be calculated from the measured values and the Henderson-Hasselbalch expression.

We claim:

1. A device for measuring the activity of carbonate ions and hydrogen ions, said device comprising a carbonate ion selective electrode pair and a pH electrode pair provided on a frame and a porous bridge; said carbonate ion selective electrode pair and said pH electrode pair being disposed such that their edges are close together but do not come into contact with each other, which prevents the electrodes from shortcircuiting; each of the electrodes of said electrode pairs comprising a metal layer, a metal halide layer and an ion selective layer superposed in this order; said porous bridge being disposed so as to be in contact with topmost layers of said electrode pairs or being disposed a short distance from said topmost layers to as to come into contact with said topmost layers via a liquid when the liquid is supplied to said device.

2. A device as defined in claim 1 in which liquid distributing members are disposed between said porous bridge and said topmost layers such that one or two of said liquid distributing members are in contact with the topmost layers of two different electrodes, one electrode from each of said electrode pairs or such that one or two of said liquid distributing members are disposed a short distance from said topmost layers so as to come into contact with the topmost layers of two different electrodes, one electrode from each of said electrode pairs, via a liquid when the liquid is supplied said device.

3. A device as defined in claim 3 in which said porous bridge is made of yarn, and said liquid distributing member is made of pieces of woven cloth which is formed from yarn or non-woven cloth which is formed from filament strings or yarn.

4. A device as defined in claim 1 in which an electrolyte layer is disposed between said metal halide layer and said ion selective layer.

5. A device as defined in claim 1 in which a buffer layer is disposed on said ion selective layer.

* * * * *